United States Patent [19]
Nerone

[11] Patent Number: 5,910,708
[45] Date of Patent: *Jun. 8, 1999

[54] GAS DISCHARGE LAMP BALLAST CIRCUIT WITH COMPLEMENTARY CONVERTER SWITCHES

[75] Inventor: Louis R. Nerone, Brecksville, Ohio

[73] Assignee: General Electric Company, Schenectady, N.Y.

[ * ] Notice: This patent is subject to a terminal disclaimer.

[21] Appl. No.: 08/709,063

[22] Filed: Sep. 6, 1996

[51] Int. Cl.⁶ .................................................. H05B 37/02
[52] U.S. Cl. ..................... 315/209 R; 315/226; 315/205; 315/243; 327/589; 363/24; 363/134
[58] Field of Search ................................ 315/209 R, 307, 315/226, 205, 243; 327/291, 589; 363/24, 134

[56] References Cited

U.S. PATENT DOCUMENTS

| | | | |
|---|---|---|---|
| 4,463,286 | 7/1984 | Justice | 315/219 |
| 4,546,290 | 10/1985 | Kerekes | 315/209 R |
| 4,588,925 | 5/1986 | Fahnrich et al. | 315/101 |
| 4,647,817 | 3/1987 | Fahnrich et al. | 315/104 |
| 4,667,345 | 6/1987 | Nilssen | 315/209 R |
| 4,692,667 | 9/1987 | Nilssen | 315/209 R |
| 4,937,470 | 6/1990 | Zeller | 323/289 |
| 4,945,278 | 7/1990 | Chern | 315/209 R |
| 5,223,767 | 6/1993 | Kulka | 315/209 R |
| 5,309,062 | 5/1994 | Perkins et al. | 315/53 |
| 5,341,068 | 8/1994 | Nerone | 315/219 |
| 5,349,270 | 9/1994 | Roll et al. | 315/209 R |
| 5,387,847 | 2/1995 | Wood | 315/209 R |
| 5,406,177 | 4/1995 | Nerone | 315/307 |
| 5,514,981 | 5/1996 | Tam et al. | 326/80 |

*Primary Examiner*—Arnold Kinkead
*Attorney, Agent, or Firm*—Charles E. Bruzga

[57] ABSTRACT

A ballast circuit for a gas discharge lamp comprises a resonant load circuit incorporating the gas discharge lamp and including a resonant inductance and a resonant capacitance. A d.c.-to-a.c. converter circuit induces an a.c. current in the resonant load circuit. The converter circuit comprises first and second converter switches serially connected in the foregoing order between a bus conductor at a d.c. voltage and a reference conductor, and being connected together at a common node through which the a.c. load current flows. The first and second converter switches comprise respective interconnected control nodes respective reference nodes interconnected together at a common node. The voltage between each control node and associated reference node determining the conduction state of the associated switch. A voltage-limited energy source is connected between first and second nodes. The first node is connected to the bus conductor through a first bootstrap capacitor, and the second node is connected to the reference conductor through a second bootstrap capacitor. A bridge network is connected between the first and second nodes and has first and second input nodes on which respective first and second input signals are applied. First and second output nodes are respectively connected to the common and control nodes so as to control the switching state of the converter switches. The first and second pairs of gate control switches are arranged to cause repetitive cycling through various states the converter switches, so as to allow residual energy from the resonant inductor to cause replenishing of the energy source.

14 Claims, 2 Drawing Sheets

GAS DISCHARGE LAMP BALLAST CIRCUIT WITH COMPLEMENTARY CONVERTER SWITCHES

FIELD OF THE INVENTION

The present invention relates to a ballast circuit for a gas discharge lamp which includes a d.c.-to a.c. converter for supplying a.c. current to a resonant load circuit, and, more particularly, to such a ballast circuit employing a pair of complementary switches in the d.c.-to-a.c. converter.

BACKGROUND OF THE INVENTION

Ballast circuits for gas discharge lamps which include an d.c.-to a.c. converter for supplying a.c. current to a resonant load circuit are known. Typically, such circuits include a pair of non-complementary switches in the d.c.-to-a.c. converter. For example, it is common to use a pair of identical, n-channel enhancement mode MOSFETs as the switches. Each of such non-complementary MOSFETs must be controlled by a separate gate-to-source (or control) voltage. This requires level shifting of voltage to couple a single control signal to each of the gate-to-source voltages of the pair of MOSFETs. Such level shifting can be accomplished by a transformer or by conventional bootstrapping means. The transformer method works well at high speeds, but is costly and hard to control. The bootstrapping method, usually implemented by an Integrated Circuit (IC), has good control capability, but is unable to work at high speeds.

It, therefore, is an object of the invention to provide a ballast circuit for a gas discharge lamp that overcomes the foregoing drawbacks.

OBJECTS AND SUMMARY OF THE INVENTION

Accordingly, it is an object of the invention to provide a gas discharge ballast circuit of the type including a pair of switches of a d.c.-to-a.c. converter, which circuit achieves good control capability as well as the ability to work at high speeds.

A further object of the invention is to provide a ballast-circuit of the foregoing type that is suitable for integration into an IC.

The foregoing objects are realized by a ballast circuit for a gas discharge lamp, which comprises a resonant load circuit incorporating the gas discharge lamp and including a resonant inductance and a resonant capacitance. A d.c.-to-a.c. converter circuit is coupled to the resonant load circuit for inducing an a.c. current in the resonant load circuit. The converter circuit comprises first and second converter switches serially connected in the foregoing order between a bus conductor at a d.c. voltage and a reference conductor, and being connected together at a common node through which the a.c. load current flows. The first and second converter switches each comprise a control node and a reference node, the voltage between such nodes determining the conduction state of the associated switch. The respective control nodes of the first and second converter switches are interconnected, and the respective reference nodes of the first and second converter switches are connected together at the common node. A voltage-limited energy source is connected between first and second nodes. The first node is connected to the bus conductor through a first bootstrap capacitor, and the second node is connected to the reference conductor through a second bootstrap capacitor. A bridge network is connected between the first and second nodes and has first and second input nodes on which respective first and second input signals are applied. First and second output nodes are respectively connected to the common and control nodes so as to control the switching state of the converter switches. An oscillator provides the first and second input signals.

The first and second pairs of gate control switches are arranged to cause repetitive cycling through at least the following states of the first and second converter switches respectively being: (1) on and off; (2) turned off and already off, and residual energy of the resonant inductance causing a shift in energy from the second bootstrap capacitor to the first bootstrap capacitor via the energy source, thereby replenishing the source with energy; (3) off and on; and (4) already off and turned off, and residual energy of the resonant inductance causing a shift in energy from the first bootstrap capacitor to the second bootstrap capacitor via the energy source, thereby replenishing the source with energy.

BRIEF DESCRIPTION OF THE DRAWINGS

The foregoing objects and further advantages and features of the invention will become apparent from the following description when taken in conjunction with the drawing, in which.

DETAILED DESCRIPTION OF THE PREFERRED EMBODIMENTS

Figure 1:
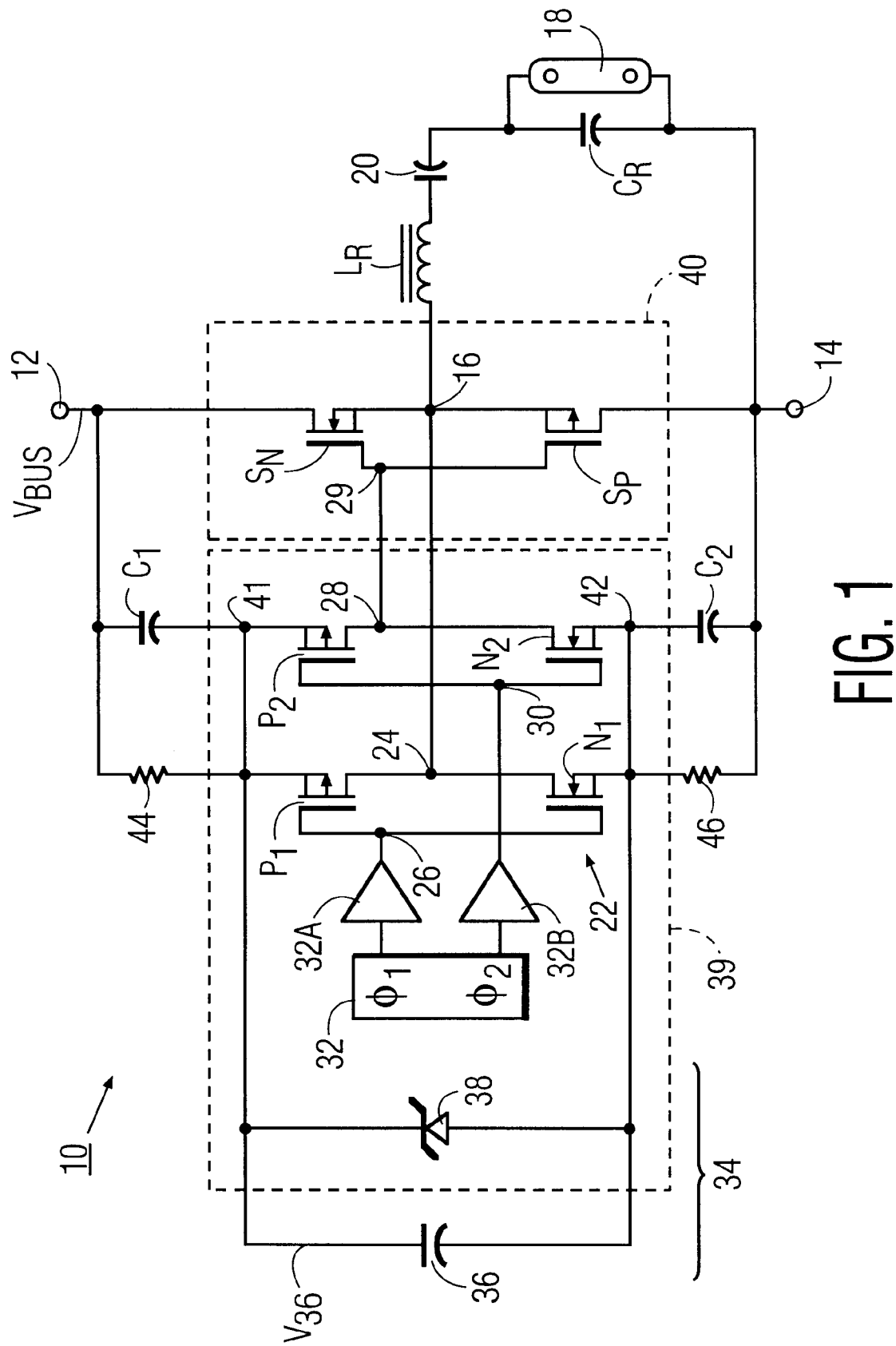
FIG. 1 is a schematic diagram, partially in block form, of a ballast circuit for a gas discharge lamp which employs complementary switches in a d.c.-to-a.c. converter, in accordance with the invention.

FIG. 1 shows a ballast circuit 10 in accordance with the invention. A d.c. bus voltage $V_{BUS}$ is applied to bus conductor 12 with respect to a reference conductor 14. The potential of reference conductor 14 is not necessarily at ground; it simply is a potential less than that of bus conductor 12. As shown, ballast circuit 10 employs a pair of switches $S_N$ and $S_P$ for implementing a d.c.-to-a.c. conversion. Switch $S_N$ may be an n-channel, enhancement mode MOSFET, while switch $S_P$ may be a p-channel, enhancement mode MOSFET. Such switches are, therefore, complementary to each other. The sources of MOSFET switches $S_N$ and $S_P$ are interconnected at common node 16, which node is alternately connected to bus conductor 12 and then to reference conductor 14, and back to bus conductor 12, and so on. Other source-to-source connected MOSFET pairs, or corresponding Bipolar Junction Transistors, could be used if desired.

Converter switches $S_N$ and $S_P$ supply a.c. current to a resonant load circuit comprised of a resonant inductor $L_R$ and a resonant capacitor $C_R$, which capacitor is shunted by lamp 18, such as a fluorescent lamp. A d.c. blocking capacitor 20 is also provided in the resonant load circuit. Converter switches $S_N$ and $S_P$ are, in turn, controlled by a bridge network 22 preferably formed of drain-connected, complementary conduction mode MOSFETs, which control the gates of the converter switches.

Specifically, bridge network 22 may comprise a first pair of such MOSFETs designated $P_1$ and $N_1$ to represent p-channel and n-channel, enhancement mode MOSFETs, respectively; and a second pair of such MOSFETs designated $P_2$ and $N_2$ for the same reason. As will be appreciated from FIG. 1, each pair $P_1$, $N_1$ and $P_2$, $N_2$ of MOSFETs have respective interconnected drains and interconnected gates. The drains of pair $P_1$, $N_1$ are connected to a first output node 24 of bridge network 22, which is connected to common node 16; the gates of such pair are connected to a first input node 26 of bridge network 22. Similarly, the drains of pair $P_2$, $N_2$ are connected to a second output node 28 of bridge network 22, which is connected to a common control node 29 of the converter switches; the gates of such pair are connected to a second input node 30 of bridge network 22. Preferably, pairs $P_1$, $N_1$ and $P_2$, $N_2$ of bridge network 22 each comprise drain-connected CMOS transistors, which are commonly available.

A first input signal is supplied to first input node 26 by an oscillator 32, via a, e.g., non-inverting buffer 32A; the first input signal is designated by $\phi_1$ in the block for the oscillator. A second input signal is supplied to second input node 30, via a, e.g., non-inverting buffer 32B, the second input signal being designated by $\phi_2$ in the block for the oscillator. The first and second input signals will be described in detail below.

In accordance with an aspect of the invention, an energy source 34 is provided for supplying energy both to power oscillator 32 and to supply, via buffers 32A and 32B, the energy needed to control switch pairs $P_1$, $N_1$ and $P_2$, $N_2$. As will be detailed below, during certain modes of operation of converter switches $S_N$ and $S_P$ residual energy in resonant inductor $L_R$ is used to replenish energy dissipated by source 34 in performing these powering functions. Energy source 34 may comprise a capacitor 36 and a Zener diode 38.

Beneficially, the circuitry inside of dashed-line box 39 described so far can be incorporated into an integrated circuit (IC), and the converter switches themselves, enclosed in dashed-line box 42, can also be incorporated into the same IC in a hybrid or monolithic form.

Each of gate control switch pairs $P_1$, $N_1$ and $P_2$, $N_2$ are connected between a first node 41 at their upper shown-portion, and a second node 42 at their lower-shown portion. A first bootstrap capacitor $C_1$ and a bias resistor 44 are connected between first node 41 and bus conductor 12. A second bootstrap capacitor $C_2$ and a bias resistor 46 are connected between second node 42 and reference conductor 14.

Bootstrap capacitors $C_1$ and $C_2$ preferably perform dual functions. One function is to act as a conventional snubber capacitor for the purpose of causing converter switches $S_N$ and $S_P$ to switch softly, as opposed to abruptly, which considerably reduces energy dissipation in the switches when they change state. The second function of the bootstrap capacitors is a bootstrapping function, wherein residual energy from resonant inductor $L_R$ is used to change the states of charge of the bootstrap capacitors, and in the process to replenish energy of source 34 used in powering oscillator 32 and buffers 32A and 32B. Bootstrap capacitors $C_1$ and $C_2$ therefore, are preferably sized to perform the bootstrap function, which may require a larger size than is required merely to perform the snubbing function. The bootstrap operation of the capacitors is detailed below.

Figure 2A:
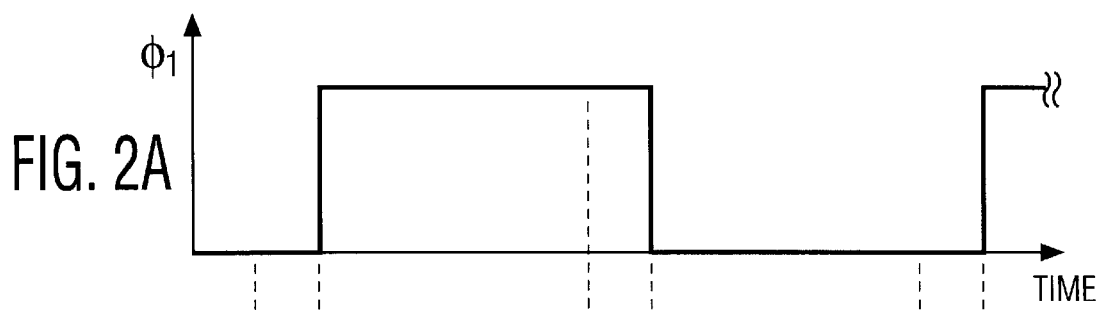
FIGS. 2A and 2B respectively show first and second input signal $\phi_1$ and $\phi_2$ used in the circuit of FIG. 1.
Figure 2B:
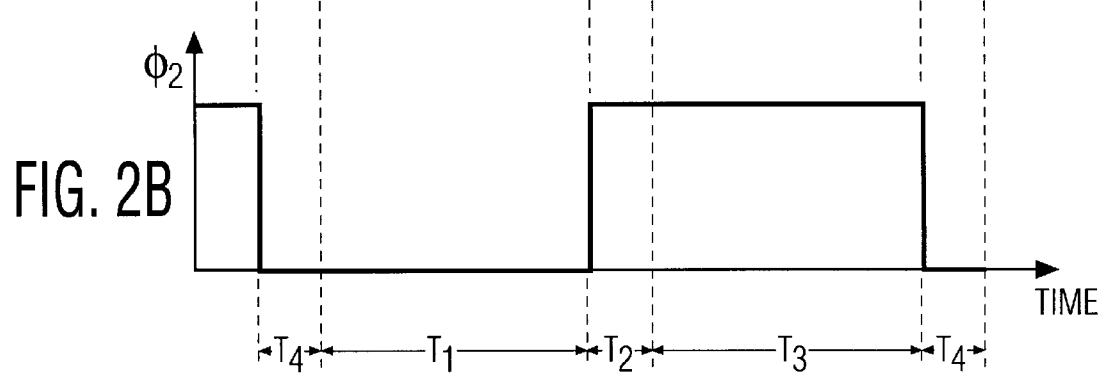

FIGS. 2A and 2B respectively show first and second input signals $\phi_1$ and $\phi_2$ produced by oscillator 32 of FIG. 1. These signals vary between "1" (or high) and "0" (or low), which refer to logic levels, whereby logic level "1" may be 5 volts, for example. In accordance with the invention, oscillator 32 (FIG. 1) provides input signals pairs $\phi_1$, $\phi_2$ that repetitively cycle through at least the four illustrated states of 1-0, 1-1, 0-1 and 0-0. These states respectively occur during time periods $T_1$, $T_2$, $T_3$ and $T_4$. As can be seen in FIG. 2B, after time period $T_4$, time period $T_1$ begins again. One or more other time periods could be interposed among time periods $T_1$ through $T_4$, and represent different input signal pairs $\phi_1$, $\phi_2$ if desired. Operation of ballast circuit 10 of FIG. 1 is now described during each of time periods $T_1$–$T_4$.

The following table identifies operating states for input signals $\phi_1$, and $\phi_2$, and the conduction states of transistors $P_1$, $N_1$, $P_2$ and $N_2$ of bridge network 22.

After the table, the conduction states of converter switches $S_N$ and $S_P$, and the bootstrap operation of capacitors $C_1$ and $C_2$, are described.

|       | $\phi_1$ | $\phi_2$ | $P_1$ | $N_1$ | $P_2$ | $N_2$ |
|-------|----------|----------|-------|-------|-------|-------|
| $T_1$ | 1        | 0        | OFF   | ON    | ON    | OFF   |
| $T_2$ | 1        | 1        | OFF   | ON    | OFF   | ON    |
| $T_3$ | 0        | 1        | ON    | OFF   | OFF   | ON    |
| $T_4$ | 0        | 0        | ON    | OFF   | ON    | OFF   |

During time period $T_1$, converter switch $S_N$ is on (or conducting) and switch $S_P$ is off. During this time, common node 16 is connected to bus conductor 12 so as to be at $V_{BUS}$, which voltage is impressed across bootstrap capacitor $C_2$ by virtue of switch $N_1$ being on. Voltages across the capacitors in FIG. 1 are from top-to-bottom. Additionally, bus voltage $V_{BUS}$ is impressed across the serially connected capacitors $C_1$, 36 and $C_2$. With voltage $V_{36}$ being the top-to-bottom voltage across energy source capacitor 36, the foregoing capacitors then respectively have voltages across them of $-V_{36}$ of typically $-12$ volts for capacitor $C_1$, $V_{36}$ of typically 12 volts for capacitor 36, and $V_{BUS}$ for capacitor $C_2$.

During time period $T_2$, converter switch $S_N$ is turned off, with switch $S_P$ remaining off as it was in time period $T_1$. Residual energy in resonant inductor $L_R$ causes current to flow through such inductor from left to right in FIG. 1, such current passing upwardly through second bootstrap capacitor $C_2$, through switch $N_1$ which is on at this time, and back to resonant inductor $L_R$. Meanwhile, bus voltage $V_{BUS}$ continues to be impressed across the serial combination of capacitors $C_1$, 36 and $C_2$. As a result, the voltage on capacitor $C_2$ changes from $V_{BUS}$ to $-V_{36}$ of typically $-12$ volts, while the voltage on capacitor $C_1$ changes from $-V_{36}$ of typically $-12$ volts to $V_{BUS}$. In this process, charge from capacitor $C_2$ is transferred via energy source capacitor 36 to capacitor $C_1$. However, some of the charge from capacitor $C_2$ is retained by capacitor 36, so as to replenish energy used in powering oscillator 32 and buffers 32A and 32B.

In the next time period $T_3$, converter switch $S_N$ remains off and switch $S_P$ is turned on. The voltages across serially connected capacitors $C_1$, 36 and $C_2$ remain as set in the preceding time period $T_2$.

In time period $T_4$, switch $S_N$ remains off and switch $S_P$ is turned off. During this time residual energy in resonant inductor $L_R$ causes current to flow through such inductor from right to left in FIG. 1. With switch $P_1$ being on at this time, such current from resonant inductor $L_R$ flows from node 16 to node 24 and upwardly through switch $P_1$ to pass through bootstrap capacitor $C_1$. Specifically, the voltage of capacitor $C_1$ changes from $V_{BUS}$ as set in time period $T_2$ to $-V_{36}$ of typically $-12$ volts. Since bus voltage $V_{BUS}$ is impressed across the serial combination of capacitors $C_1$, 36 and $C_2$, the voltage of capacitor $C_2$ changes in from $-V_{36}$ of typically $-12$ volts set in time period $T_2$, to $V_{BUS}$, while capacitor $V_{36}$ remains at a nearly constant voltage (e.g. 12 volts). In the process of capacitor $C_2$ becoming charged to $V_{BUS}$, charge is transferred from capacitor $C_1$ to capacitor $C_2$. Some charge from capacitor $C_1$ is absorbed by energy source capacitor 36 to replenish energy dissipated in powering oscillator 32 and buffers 32A and 32B.

In the foregoing manner, energy source 34 is supplied with residual energy from resonant inductor $L_R$ during switching periods (e.g., $T_2$, $T_4$) when one converter switch is already off and the other is turned off.

To produce the waveforms shown in FIG. 2 for first and second input signals $\phi_1$ and $\phi_2$, oscillator 32 may comprise a conventional square-wave generator for first input signal $\phi_1$, such as a commonly available 555 IC timer operating in a 50 percent duty ratio mode. To produce second input signal $\phi_2$ a delay circuit from first signal $\phi_1$, such as an R-C (resistive-capacitive) circuit (not shown) can be used to provide a delay, followed by a Schmitt trigger to square up the signal.

Exemplary component values for ballast circuit 10 of FIG. 1 are as follows for a fluorescent lamp 18 rated at 25 watts, with a d.c. bus voltage of 150 volts:

Resonant inductor $L_R$. . . 800 micro henries

Resonant capacitor $C_R$. . . 7.7 nanofarads

D.c. blocking capacitor 20 . . . 220 nanofarads

Bootstrap capacitors $C_1$ and $C_2$, each . . . 680 picofarads

Bias resistors 44 and 46, each . . . 100 k ohms

Zener diode 38 . . . 12 volts

Energy source capacitor 36 . . . 1 microfarad

Additionally, converter switch $S_N$ may be an IRF610, n-channel, enhancement mode MOSFET, sold by International Rectifier Company, of E1 Segundo, Calif.; converter switch $S_P$, an IRF9610, p-channel, enhancement mode MOSFET also sold by International Rectifier Company; gate control switch pairs $P_1$, $N_1$ and $P_2$, $N_2$, each 4000-series pair of drain-connected CMOS transistors, such as sold by Motorola of Phoenix, Ariz., or available as IRF9Z10-IRFZ10 CMOS pairs sold by International Rectifier Company. Finally, exemplary times $T_1$, $T_2$, $T_3$ and $T_4$ used by oscillator 32 are, respectively, 6.5 microseconds, 1 microsecond, 6.5 microseconds, and 1 microseconds.

The foregoing describes a gas discharge ballast circuit of the type including a pair of switches of a d.c.-to-a.c. converter. The ballast circuit achieves good control capability as well as the ability to work at high speeds.

While the invention has been described with respect to specific embodiments by way of illustration, many modifications and changes will occur to those skilled in the art. It is therefore, to be understood that the appended claims are intended to cover all such modifications and changes as fall within the true spirit and scope of the invention.

What is claimed is:

1. A ballast circuit for a gas discharge lamp, comprising:
   (a) a resonant load circuit incorporating the gas discharge lamp and including a resonant inductance and a resonant capacitance;
   (b) a d.c.-to-a.c. converter circuit coupled to said resonant load circuit for inducing an a.c. current in said resonant load circuit, said converter circuit comprising:
      (i) first and second converter switches serially connected in the foregoing order between a bus conductor at a d.c. voltage and a reference conductor, and being connected together at a common node through which said a.c. load current flows;
      (ii) said first and second converter switches each comprising a control node and a reference node, the voltage between such nodes determining the conduction state of the associated switch;
      (iii) the respective control nodes of said first and second converter switches being interconnected; and
      (iv) the respective reference nodes of said first and second converter switches being connected together at said common node;
   (c) a voltage-limited energy source connected between first and second nodes;
   (d) said first node being connected to said bus conductor through a bootstrap capacitor, and said second node being connected to said reference conductor through a bootstrap capacitor; and
   (e) a bridge network being connected between said first and second nodes and having:
      (i) first and second input nodes on which respective first and second input signals are applied; and
      (ii) first and second output nodes respectively connected to said common and control nodes so as to control the switching state of said converter switches;
   (f) an oscillator for providing said first and second input signals;
   (g) said bridge network being arranged to cause repetitive cycling through at least the following states of said first and second converter switches respectively being:
      (i) on and off;
      (ii) turned off and already off, and residual energy of said resonant inductance causing a shift in energy from one of said bootstrap capacitors to the other of said bootstrap capacitors via said energy source, thereby replenishing said source with energy;
      (iii) off and on;
      (iv) already off and turned off, and residual energy of said resonant inductance causing a shift in energy from said other of said bootstrap capacitors to said one of said bootstrap capacitors via said energy source, thereby replenishing said source with energy.

2. The ballast circuit of claim 1, wherein said oscillator is arranged to cause repetitive cycling between first input signal-second input signal pairs of at least high-low, high-high, low-high, and low-low states.

3. The ballast circuit of claim 1, wherein said bridge circuit comprises:
   (a) a first pair of gate control switches connected between said first and second nodes, having complementary conduction modes which change in response to a first input signal applied to commonly connected control nodes of said switches, and being connected together serially at said first output node; and
   (b) a second pair of gate control switches connected between said first and second nodes, having complementary conduction modes which change in response to a second input signal applied to commonly connected control nodes of said switches, and being connected together serially at said second output node.

4. The ballast circuit of claim 3, wherein said first and second pairs of gate control switches comprise drain-connected CMOS transistors, with like-conduction mode transistors being connected to said first node.

5. The ballast circuit of claim 1, further including means to power said oscillator and to supply power to control said bridge network from said energy source.

6. The ballast circuit of claim 5, wherein said bridge network and said oscillator are contained in an integrated circuit.

7. The ballast circuit of claim 6, wherein said energy source contains a Zener diode for voltage-limiting purposes, said Zener diode also being contained in said integrated circuit.

8. The ballast circuit of claim 6, wherein said first and second converter switches are also contained in said integrated circuit.

9. A ballast circuit for a gas discharge lamp, comprising:
(a) a resonant load circuit incorporating the gas discharge lamp and including a resonant inductance and a resonant capacitance;
(b) a d.c.-to-a.c. converter circuit coupled to said resonant load circuit for inducing an a.c. current in said resonant load circuit, said converter circuit comprising:
  (i) first and second converter switches serially connected in the foregoing order between a bus conductor at a d.c. voltage and a reference conductor, and being connected together at a common node through which said a.c. load current flows;
  (ii) said first and second converter switches each comprising a control node and a reference node, the voltage between such nodes determining the conduction state of the associated switch;
  (iii) the respective control nodes of said first and second converter switches being interconnected; and
  (iv) the respective reference nodes of said first and second converter switches being connected together at said common node;
(c) a voltage-limited energy source connected between first and second nodes;
(d) said first node being connected to said bus conductor through a first bootstrap capacitor, and said second node being connected to said reference conductor through a second bootstrap capacitor;
(e) a first pair of gate control switches connected between said first and second nodes, having complementary conduction modes which change in response to a first input signal applied to commonly connected control nodes of said switches, and being connected together serially at a first output node;
(f) a second pair of gate control switches connected between said first and second nodes, having complementary conduction modes which change in response to a second input signal applied to commonly connected control nodes of said switches, and being connected together serially at a second output node;
(g) the respective switches of said first and second pairs of gate control switches that are connected to said first node having the same conduction mode;
(h) said first and second output nodes being respectively connected to said common and control nodes so as to control the switching state of said converter switches; and
(i) an oscillator for providing said first and second input signals;
(j) said oscillator being arranged to cause repetitive cycling between first input signal-second output signal pairs of at least high-low, high-high, low-high, and low-low states.

10. The ballast circuit of claim 9, wherein said first and second pairs of gate control switches comprise drain-connected CMOS transistors.

11. The ballast circuit of claim 9, further including means to power said oscillator and to supply power to control said first and second pairs of gate control switches from said energy source.

12. The ballast circuit of claim 11, wherein said first and second pairs of control switches and said oscillator are contained in an integrated circuit.

13. The ballast circuit of claim 12, wherein said energy source contains a Zener diode for voltage-limiting purposes, said Zener diode also being contained in said integrated circuit.

14. The ballast circuit of claim 12, wherein said first and second converter switches are also contained in said integrated circuit.

* * * * *